May 25, 1954  T. L. THACKER  2,679,397
ELECTRICALLY CONTROLLED CHESS BOARD
Filed Dec. 1, 1951  2 Sheets-Sheet 1

INVENTOR
THOMAS LINDSAY THACKER
ATTORNEY

May 25, 1954  T. L. THACKER  2,679,397
ELECTRICALLY CONTROLLED CHESS BOARD
Filed Dec. 1, 1951  2 Sheets-Sheet 2
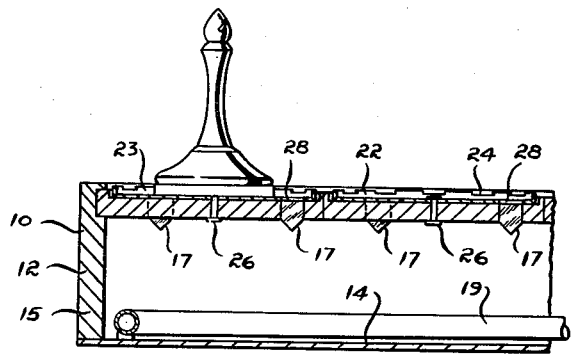
Fig. 3.
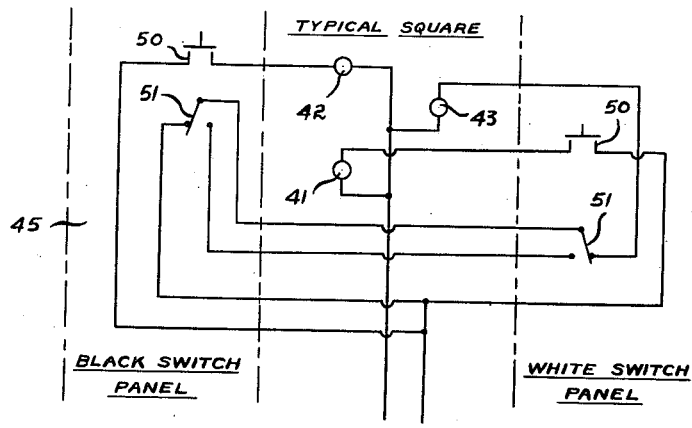
Fig. 6.
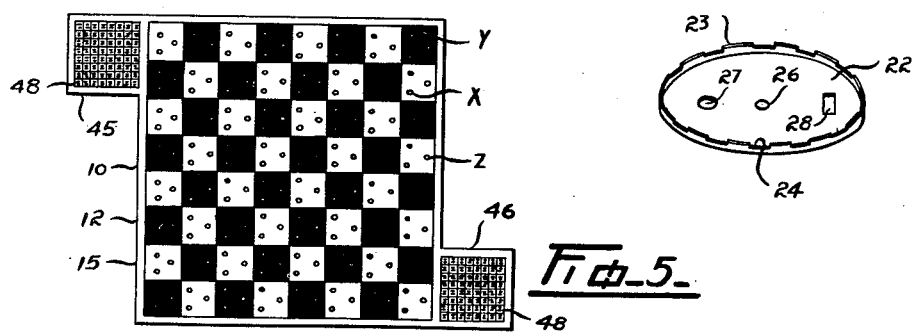
Fig. 4.
Fig. 5.
INVENTOR
THOMAS LINDSAY THACKER
ATTORNEY Patented May 25, 1954

2,679,397

UNITED STATES PATENT OFFICE 2,679,397

ELECTRICALLY CONTROLLED
CHESS BOARD

Thomas Lindsay Thacker, Hope, British
Columbia, Canada

Application December 1, 1951, Serial No. 259,418

3 Claims. (Cl. 273—136)

My invention relates to improvements in chess boards.

The objects of the invention are primarily to provide a chess board on the squares of which may be displayed an indication of any or all squares which are under attack from one chessman or another, or which are defended by one or more chessmen, so that any person watching the game may see at a glance the immediate results of each player's move. By making it possible for a young or relatively inexperienced player to see what he must guard against, his understanding of the game improves rapidly, and both players will enjoy a better game by avoiding the effects of hasty ill-considered moves. The device will make it much easier for a beginner to appreciate the complexity of moves by the different chessmen and to learn more quickly than he can possibly do with the present type of board. A still further object of the invention is to illustrate the game being played to any spectators, so that they can grasp clearly the intent of the players as each move is made.

Referring to the accompanying drawings:

Figure 3 is a fractional detail sectional view of the board shown in Figure 1 and taken on the line 3—3 of Figure 1.

Figure 4 is a perspective view of a mask shown in Figures 1, 2 and 3.

Figure 5 is a plan view of a modified form of chess board.

Figure 6 is a wiring diagram to the lights of a typical square of the board shown in Figure 5 and a unit of the Black and White switches for controlling said lights.

In the drawings like characters of reference indicate corresponding parts in each figure.

Figure 1:
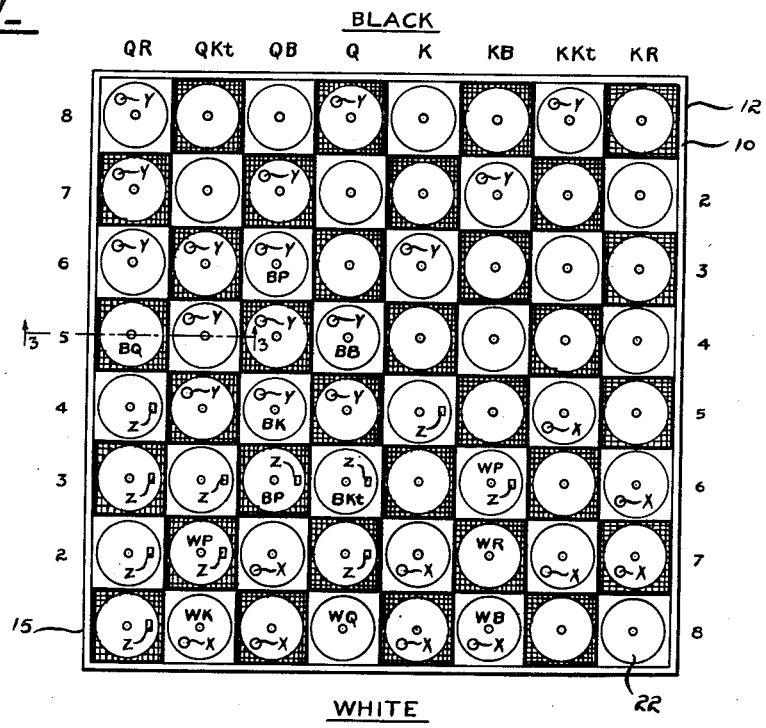
Figure 1 is a plan view of the preferred form of the invention showing a game of chess in play thereon.

The numeral 10 indicates generally a chess board divided into sixty-four squares in the usual manner, with one set of squares being white and the alternate squares being black or other suitable colours. In the examples shown the black squares are shown with heavy border lines to identify them from the white.

The board 10 according to the preferred method of construction, would be of plastic or other material which may be translucent or opaque to identify the black and white squares of the board, and would be mounted upon a casing 12 having a base panel 14 and side walls 15. The squares of the board 10 are each provided with coloured transparent prisms 17, or spots, which are substantially flush with the top of the board and project below said board so as to receive an ample amount of light from a lamp 19 which may be of the neon or mercury vapour type. The prisms are preferably coloured to show amber, green and red lights through the board and are successively indicated by X, Y and Z. The letter X indicates an amber light controlled by the player of White; the letter Y indicates a green light controlled by the player of Black, and the letter Z indicates the red light controlled by either or both of the players. The amber spot X is disposed at degree 225 in a clockwise direction starting at the top centre of the square, the green spot Y is at degree 315, and the red spot Z is disposed at degree 90 of the square.

Rotatably mounted in the centre of each square is a circular mask 22 of opaque material having an upstanding rim 23 which is preferably serrated as at 24 so that it can be conveniently engaged by the finger or finger nail to turn it about its fulcrum pin 26. The mask 22 is provided with two openings 27 and 28, both of which are spaced to register on appropriate manipulation with the spots X and Y and Z respectively, but are spaced 180 degrees apart so that a mask may be turned so as not to expose any of the colour spots X, Y, Z as indicated in Figure 2. For the purpose of clarity, the openings 27 and 28 are not specifically shown in Figure 1, except to display a colour spot exposed thereby.

In the modification shown in Figures 5 and 6, the board 10 is divided into squares as previously described and each square is provided with translucent colour spots X, Y, Z as before, each of which are adapted to be illuminated with small electric light bulbs 41, 42 and 43 disposed in circuits within the casing and extending into two switch panels 45 and 46. Each of the switch panels are divided into sixty-four squares 48 to correspond with the squares of the board 10 and each square 48 has a normally open switch 50 and a two way switch 51. The diagram Fig. 6 shows the necessary circuits to control the light bulbs 41, 42 and 43 for one square only. The switches 50 of the switch panel 45, which is contiguous to the Black side of the board control the green light spot Y, and the switches 50 of the panel 46 which is contiguous to the White side of the board, control the amber light spot X, and the two way switches 51 of both switch panels control the red light spots Z, so that each player can turn on any of his own series of amber or green spots and both players control any of the red light spots to turn them on or off.

Figure 2:
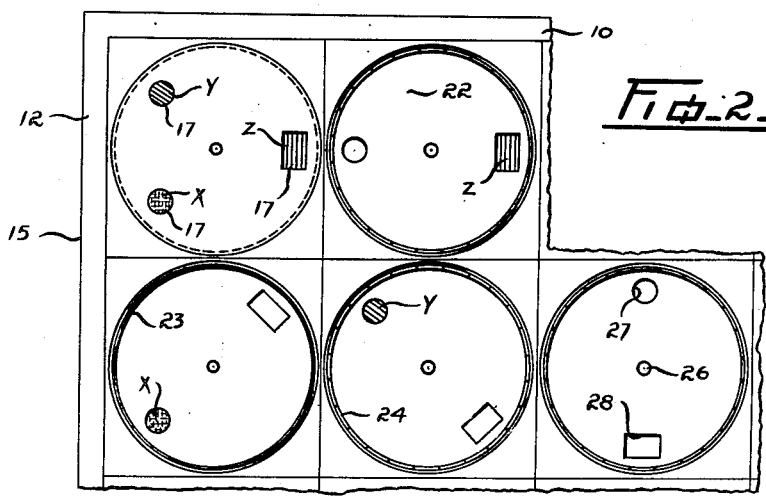
Figure 2 is a fractional detail plan view of the upper left hand corner of the chess board showing squares displaying indicia capable of use in indicating attack or defence by chessmen of one or both players.

In Figure 1, chessmen as indicated by the conventional symbols of the game, are on the board and include a black knight which is on Q3 taken from White's side of the board, other chessmen and positions are white king, QKt., white queen, Q; white bishop, KB; white pawn, QKt.2; white rook, KB2; black pawn, QB3; white pawn, KB3; black king, QB4; black queen, QR5; black bishop Q5; and black pawn, QB6. Each player has, following each move, identified the squares of the board which had come under attack or become commanded by the said move, should White bring a square under attack he will turn the mask 22 on the attacked square to display the amber spot X. When Black moves, if he puts the amber marked square under attack too, one of the players changes the mask to efface the amber spot and to display the red spot Z, indicating that the square is then under attack from each side. The first player, thus warned, watches to determine by which piece he is likely to be attacked. If a player contemplates moving a white piece onto a square having a green spot displayed, he will be able to determine quickly which piece he is likely to be attacked by, thereby causing him to refrain from making the contemplated move or to carefully calculate what possible defence he can set up in case his piece is taken on the move being made.

It will be noticed that while the squares dominated or under attack by most of the pieces are identified by an amber, green or red spot, those dominated by BKt. are not identified. Study of this move will show that there is no place where the black knight may be moved to, which will not put the black king in check, consequently if the piece cannot be moved at all no adjacent squares can become under attack by said piece.

It will be obvious that as soon as a player moves a piece, he will change the identity of adjacent pieces which were previously under attack by said piece, as for example if the white pawn on KB3 were moved forward one square to rank 4 (among other changes), the square of KKt.4 would require to have its amber spot X defaced or covered by turning the mask 22 to leave no spots in view.

In the modification shown in Figures 5 and 6, when a chessman is moved by White to put one or more squares under attack, he identifies these squares by illuminating the amber light spots therein and if Black moves one of his chessmen to a point where he attacks one or more of the squares identified as under attack by White, then instead of Black illuminating the appropriate green spots of said square or squares he operates one or more of the two way switches to illuminate the red spot and to identify the squares which are now under attack from both sides.

A similar result to the above would be achieved with the invention as shown in Figures 1, 2 and 3 by simply turning the masks to expose the red spot Z and to cover both the amber and the green.

Obviously if the board as shown in Figures 1, 2 and 3 were not illuminated from below, but was being used in an adequately lit room, bottom lighting would not be necessary and the spots X, Y and Z could be of opaque material and be identified by colour, letter or otherwise and the movement of a mask to expose a spot so that it could be clearly seen or to totally obscure any of the spots, would be equally effective in indicating that a square was or was not under attack.

What I claim as my invention is:

1. A chess board having alternately spaced black and white squares, each square having three separate zones, a lamp bulb for illuminating each zone, said lamp bulbs of each square being of contrasting color, a switchboard connected with opposite ends of the board, each switchboard having a switch controlling the operation of one lamp bulb only on each square and a second switch controlling the operation of a second lamp bulb on each square.

2. A chess board having alternately spaced black and white squares, each square having three separate zones, a lamp bulb for illuminating each zone, said lamp bulbs of each square being of contrasting color, a switchboard for the opposing players connected with opposite ends of the board, said switchboard of the player playing black having a switch controlling the operation of one lamp bulb on each square and a two way switch controlling a second lamp bulb on each square, said switchboard of the player playing white having a switch controlling the operation of a third lamp bulb on each square and a two way switch controlling the second lamp bulb on each square controlled by the player playing black.

3. A chess board having alternately spaced black and white squares, each square having three separate zones, a lamp bulb for illuminating each zone, said lamp bulbs of each square being of contrasting color, a switchboard connected with opposite ends of the board, each switchboard having squares corresponding to the squares of the chess board, each switchboard square having a normally open switch and a two way switch, each normally open switch being adapted to control one only of the lamp bulbs on each square and each two way switch being adapted to control a second lamp bulb on each square.

References Cited in the file of this patent

UNITED STATES PATENTS

| Number | Name | Date |
|---|---|---|
| 655,264 | Nichol | Aug. 7, 1900 |
| 927,583 | Nelson | July 13, 1909 |
| 1,371,476 | Foss | Mar. 15, 1921 |

FOREIGN PATENTS

| Number | Country | Date |
|---|---|---|
| 369,283 | Germany | Feb. 17, 1923 |
| 328,749 | Great Britain | Jan. 22, 1930 |